United States Patent
Nishioka

[11] Patent Number: 6,067,304
[45] Date of Patent: May 23, 2000

[54] NO-HIT SWITCHING APPARATUS

[75] Inventor: Yoshikazu Nishioka, Tokyo, Japan

[73] Assignee: NEC Corporation, Tokyo, Japan

[21] Appl. No.: 09/038,161

[22] Filed: Mar. 11, 1998

[30] Foreign Application Priority Data

Mar. 12, 1997 [JP] Japan ................................. 9-056760

[51] Int. Cl.⁷ ............................................... H04L 7/033
[52] U.S. Cl. .............................. 370/516; 375/371; 327/3; 327/151; 327/153
[58] Field of Search ................................. 370/503, 509, 370/516, 517; 375/371, 372, 373, 374, 375; 327/1, 2, 3, 141, 144, 151, 153, 160, 161, 162, 163

[56] References Cited

U.S. PATENT DOCUMENTS

| | | | |
|---|---|---|---|
| 5,327,430 | 7/1994 | Urbansky | 370/105.3 |
| 5,359,605 | 10/1994 | Urbansky et al. | 370/105.3 |
| 5,731,770 | 3/1998 | Minoda | 341/61 |
| 5,859,882 | 1/1999 | Urbansky | 375/375 |
| 5,982,833 | 11/1999 | Waters | 375/372 |

FOREIGN PATENT DOCUMENTS

| | | |
|---|---|---|
| 3-165132 | 7/1991 | Japan . |
| 7-131444 | 5/1995 | Japan . |
| 7-327018 | 12/1995 | Japan . |

OTHER PUBLICATIONS

English translation of Japanese Office Action dated Apr. 6, 1999 (Hei 11).

*Primary Examiner*—Alpus H. Hsu
*Attorney, Agent, or Firm*—Whitham, Curtis & Whitham

[57] ABSTRACT

A no-hit switching apparatus includes a phase comparing circuit, a first selecting circuit, a second selecting circuit, a memory circuit, a read address counter, and a switching circuit. The phase comparing circuit compares the phases of two received signals. The first selecting circuit selects a signal with a smaller phase delay from the two received signals on the basis of the comparison result in the phase comparing circuit. The second selecting circuit selects a signal with a larger phase delay from the two received signals on the basis of the comparison in the phase comparing circuit. The memory circuit stores the signal selected by the first selecting circuit. The read address counter reads out the signal stored in the memory circuit with the phase of the signal with the larger phase delay. The switching circuit switches between the signal read out by the read address counter and the signal selected by the second selecting circuit.

7 Claims, 4 Drawing Sheets

NO-HIT SWITCHING APPARATUS

BACKGROUND OF THE INVENTION

The present invention relates to a no-hit switching apparatus and, more particularly, to a no-hit switching apparatus for receiving two main signals, switching them without any hit, and selecting one of them.

In general, a no-hit switching apparatus for switching between received signals without any hit in a digital communication system stores two main signals in corresponding memory circuits in accordance with the operations of corresponding frame pulses. This apparatus realizes no-hit phase matching and switching of the two main signals by reading data from these memory circuits in accordance with a common read counter.

FIG. 4 shows a conventional no-hit switching device disclosed in Japanese Patent Laid-Open No. 6-61984. In FIG. 4, multi-frame pulse detecting circuits 21 and 22 detect the heads of multi-frames of main signals A and B to output multi-frame pulses A115 and B117. Using the multi-frame pulses A115 and B117 as triggers, write counters 31 and 32 generate write addresses for writing main signals A111 and B112 in memory circuits 11 and 12. A delay signal selecting circuit 4 compares the multi-frame pulse A115 with the multi-frame pulse B117 to output a multi-frame pulse whose absolute delay amount is larger, as a multi-frame pulse D118.

A multi-frame pulse generating circuit 5 generates a minimum-delay reading multi-frame pulse 119 for the multi-frame pulse D118 in response to a frame pulse 115. Using the reading multi-frame pulse 119 as a trigger, a read counter 6 generates a read address for reading out the main signals A and B from the memory circuits 11 and 12.

By the read address, the absolute delay amount of the signal read out from the memory circuit 11, and that of the main signal read out from the memory circuit 12 are made to match each other with the minimum delay. By controlling a selecting circuit 7 with a switching signal 114, switching of an output signal 113 can be executed without any error to the main signals A and B.

As another conventional technique of this type, Japanese Patent Laid-Open No. 3-93331 discloses the technique of detecting a phase difference between input signals in a frame phase comparator section and matching the phase of second or subsequent data to that of first data in accordance with this phase difference. Japanese Patent Laid-Open No. 1-180148 discloses the synchronization switching circuit capable of increasing the error detection rate by prolonging the error count time as much as possible.

In these conventional no-hit switching apparatuses, however, the cost is undesirably high because a memory circuit must be arranged for each main signal.

As a technique associated with the no-hit switching apparatus, Japanese Patent Laid-Open No. 8-111675 discloses the technique of generating a timing matched with the input timing of external data by a delay line and reading the external data stored in an elastic store circuit at this timing. Japanese Patent Laid-Open No. 5-122199 discloses the technique of receiving 0- and 1-system transmission signals from an existing device to detect a phase difference between them, and giving this phase difference to own 0- and 1-system transmission signals.

U.S Pat. Nos. 5,189,670 and 5,218,602 also disclose the techniques associated with the no-hit switching apparatus.

However, these associated techniques do not disclose any detailed memory circuit for storing each main signal. Therefore, in these associated techniques, no technique of decreasing the number of memory circuits for storing main signals to one is disclosed.

SUMMARY OF THE INVENTION

It is an object of the present invention to provide a no-hit switching apparatus in which the number of memory circuits is decreased to one to reduce the number of components.

In order to achieve the above object, according to the present invention, there is provided a no-hit switching apparatus comprising phase comparing means for comparing phases of two received signals, first selecting means for selecting a signal with a smaller phase delay from the two received signals on the basis of a comparison result in the phase comparing means, second selecting means for selecting a signal with a larger phase delay from the two received signals on the basis of comparison in the phase comparing means, memory means for storing the signal selected by the first selecting means, read means for reading out the signal stored in the memory means with a phase of the signal with the larger phase delay, and switching means for switching between the signal read out by the read means and the signal selected by the second selecting means.

DESCRIPTION OF THE PREFERRED EMBODIMENT

The present invention will be described in detail below with reference to the accompanying drawings.

Figure 1:
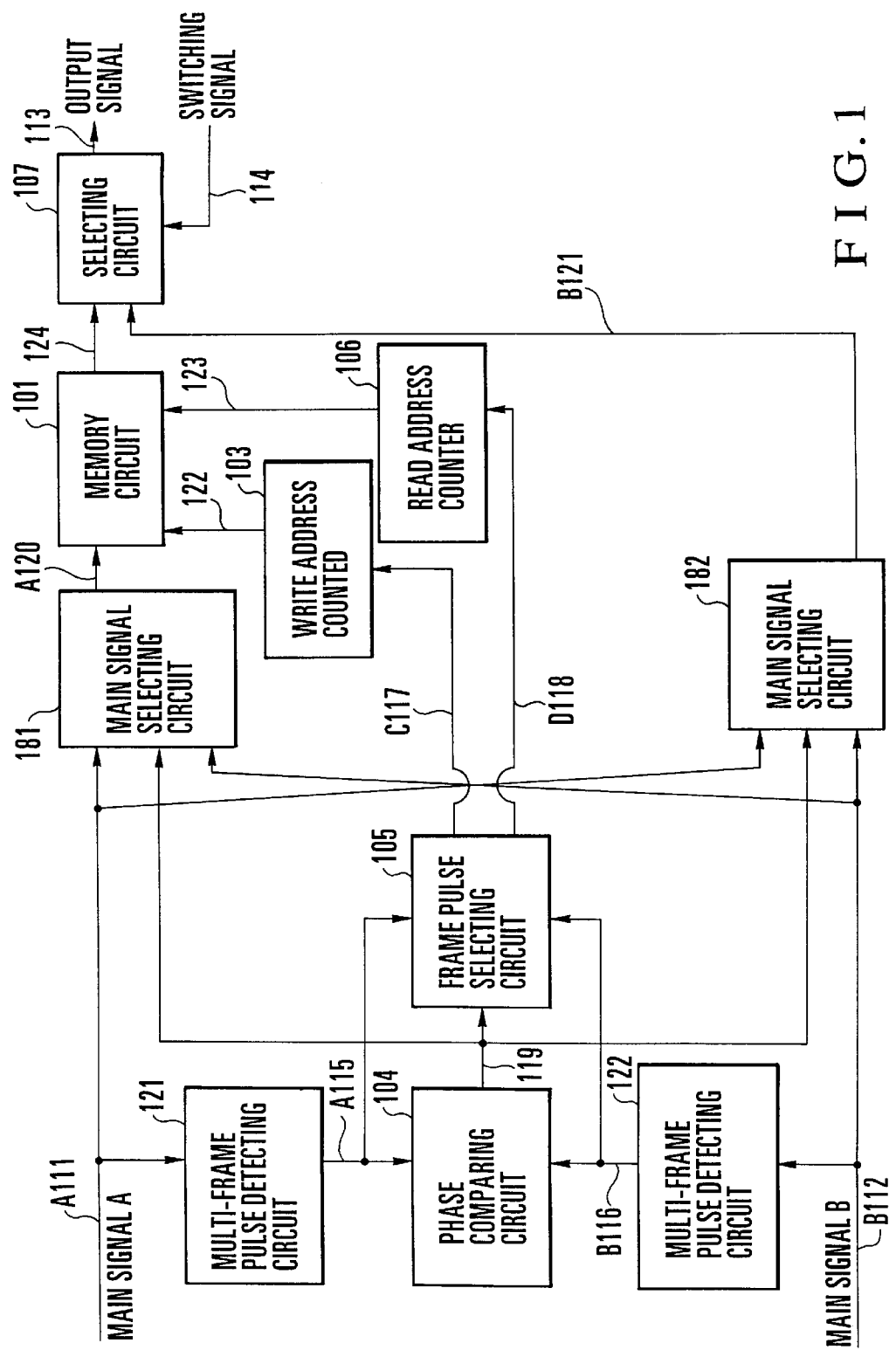
FIG. 1 is a block diagram of a no-hit switching apparatus according to an embodiment of the present invention.

FIG. 1 shows a no-hit switching apparatus according to an embodiment of the present invention. In FIG. 1, the no-hit switching apparatus comprises a multi-frame pulse detecting circuit 121 for inputting a main signal A111, a multi-frame pulse detecting circuit 122 for inputting a main signal B112, a phase comparing circuit 104 for receiving two outputs from the multi-frame pulse detecting circuits 121 and 122, a frame pulse selecting circuit 105 for receiving an output from the phase comparing circuit 104, a main signal selecting circuit 181 for receiving the main signals A111 and B112 and the output from the phase comparing circuit 104, a main signal selecting circuit 182 for receiving the main signals A111 and B112 and the output from the phase comparing circuit 104, a memory circuit 101 for receiving an output from the main signal selecting circuit 181, a write address counter 103 for receiving an output from the frame pulse selecting circuit 105 to supply a write address to the memory circuit 101, a read address counter 106 for receiving the output from the frame pulse selecting circuit 105 to supply a read address to the memory circuit 101, and a selecting circuit 107.

The multi-frame pulse detecting circuit 121 detects the head of a multi-frame of the main signal A111 to output a multi-frame pulse A115. The multi-frame pulse detecting circuit 122 detects the head of a multi-frame pulse of the main signal B112 to output a multi-frame pulse B116. The phase comparing circuit 104 compares the absolute delay amounts of the multi-frame pulses A115 and B116 to determine which of them is larger, and outputs a phase comparison result signal 119 (binary signal of "H" or "L").

In accordance with the phase comparison result signal 119 from the phase comparing circuit 104, the frame pulse selecting circuit 105 outputs, of the multi-frame pulses A115 and B116, a pulse with a smaller phase delay as a multi-frame pulse C117, and a pulse with a larger phase delay as a multi-frame pulse D118.

In accordance with the value of the phase comparison result 119 from the phase comparing circuit 104, the main signal selecting circuit 181 outputs, of the main signals A111 and B112, a signal with a smaller phase delay as a selected signal A120. In accordance with the value of the phase comparison result 119 from the phase comparing circuit 104, the main signal selecting circuit 182 outputs, of the main signals A111 and B112, a signal with a larger phase delay as a selected signal B121.

Using the multi-frame pulse C117 from the frame pulse selecting circuit 105 as a trigger, the write address counter 103 generates a write address 122 for writing data in the memory circuit 101. Using the multi-frame pulse D118 from the frame pulse selecting circuit 105 as a trigger, the read address counter 106 generates a read address 123 for reading out data from the memory circuit 101.

The selected signal A120 is stored in the memory circuit 101 in accordance with the write address 122 output from the write address counter 103. Data is read out and output from the memory circuit 101 in accordance with the read address 123 output from the read address counter 106. The value of the write address 122 indicates the location of the selected signal A120 in the multi-frame. The value of the read address 123 indicates the location of the selected signal B121 in the multi-frame. Therefore, an output signal 124 from the memory circuit 101 is at the same location as the location of the selected signal B121 in multi-frame. That is, the phases of the output signal 124 and the selected signal B121 match each other.

In this manner, even with one memory circuit 101, switching between the main signals A and B by the selecting circuit 107 can be executed without any error to the main signals A and B. In a conventional no-hit switching apparatus, since a memory read is performed by a timing pulse in the no-hit switching apparatus, a slight phase difference is generated between the frame pulses of main signals. To the contrary, in the present invention, the phase delay of an output signal can also be minimized because the memory read timing is matched to the phase of a main signal with a larger phase delay.

The operation of the no-hit switching apparatus shown in FIG. 1 will be explained in detail with reference to timing charts shown in FIGS. 2A to 2I.

Figure 2:
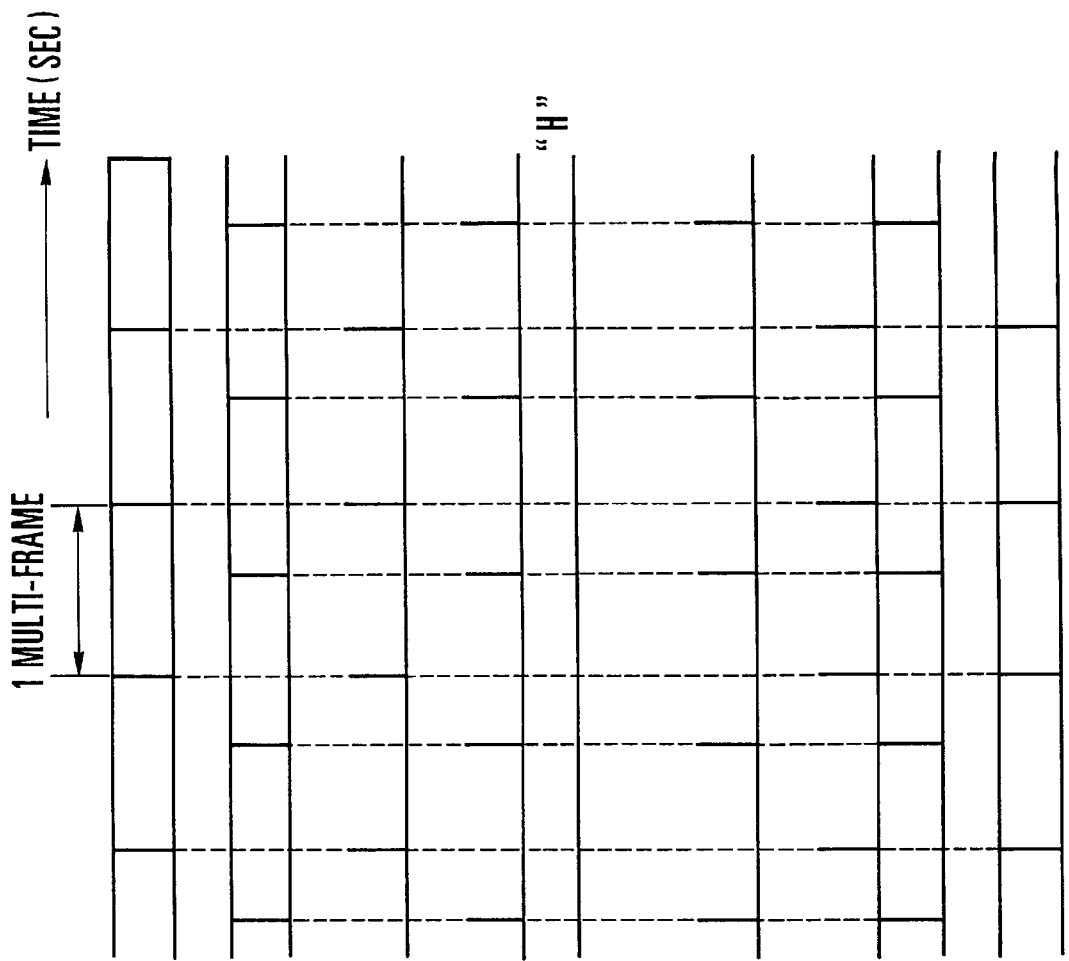
FIGS. 2A to 2I are timing charts showing the operation of the no-hit switching apparatus shown in FIG. 1.

When frames of the main signals A111 and B112 are input at timings shown in FIGS. 2A and 2B, the multi-frame pulse detecting circuit 121 detects the head of a multi-frame of the main signal A111 to generate the multi-frame pulse A115, as shown in FIG. 2C. On the other hand, the multi-frame pulse detecting circuit 122 detects the head of a multi-frame of the main signal B112 to generate the multi-frame pulse B116, as shown in FIG. 2D.

The phase comparing circuit 104 compares the two multi-frame pulses A115 and B116 to determine that, e.g., the phase delay of the multi-frame pulse A115, i.e., the main signal A111 is larger, and outputs the phase comparison result signal 119, as shown in FIG. 2E.

The frame pulse selecting circuit 105 generates the multi-frame pulses C117 and D118 in accordance with the phase comparison result signal 119, as shown in FIG. 2G. Since the phase comparison result shown in FIG. 2E is "H" (representing that the delay of the main signal A111 is larger), the multi-frame pulse B116 with a smaller phase delay is output as the multi-frame pulse C117 (FIG. 2F); and the multi-frame pulse A115 with a larger phase delay, as the multi-frame pulse D118 (FIG. 2G).

In accordance with the phase comparison result signal 119, the main signal selecting circuit 181 outputs, of the main signals A111 and B112, a signal with a smaller phase delay as the selected signal A120, as shown in FIG. 2H. Since the phase comparison result shown in FIG. 2E is "H", the main signal B with a smaller phase delay is output as the selected signal A120 (FIG. 2H).

In accordance with the phase comparison result signal 119, the main signal selecting circuit 182 outputs, of the main signals A and B, a signal with a larger phase delay as the selected signal B121, as shown FIG. 2I. Since the phase comparison result shown in FIG. 2E is "H", the main signal A with a larger phase delay is output as the selected signal B121 (FIG. 2I).

The write and read operations of the memory circuit 101 will be explained below with reference to FIGS. 3A to 3H. FIGS. 3A to 3H show timings of FIGS. 2A to 2I enlarged along the time axis.

Figure 3:
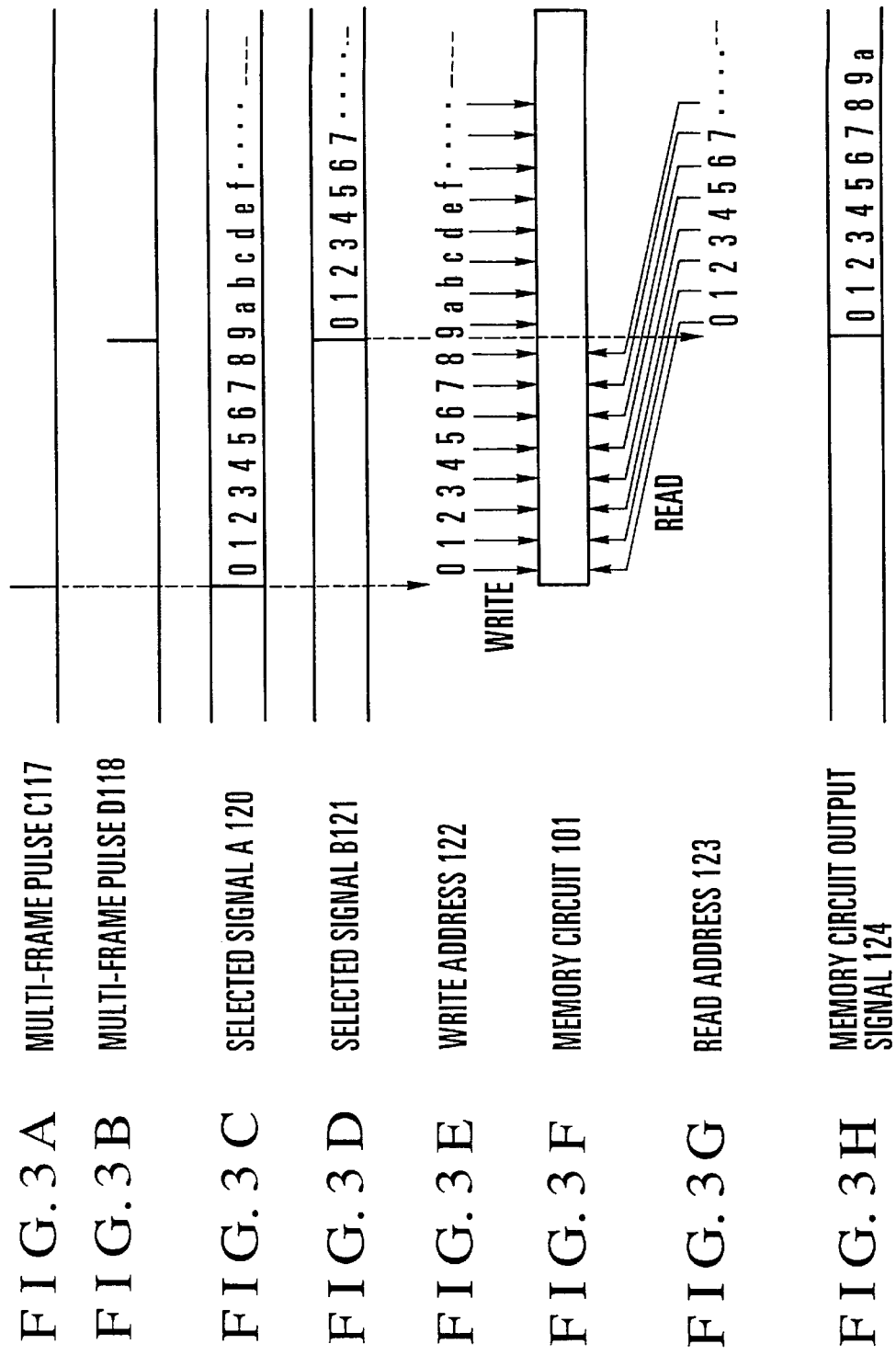
FIGS. 3A to 3H are timing charts showing the write and read operations of a memory circuit shown in FIG. 1.
Figure 4:
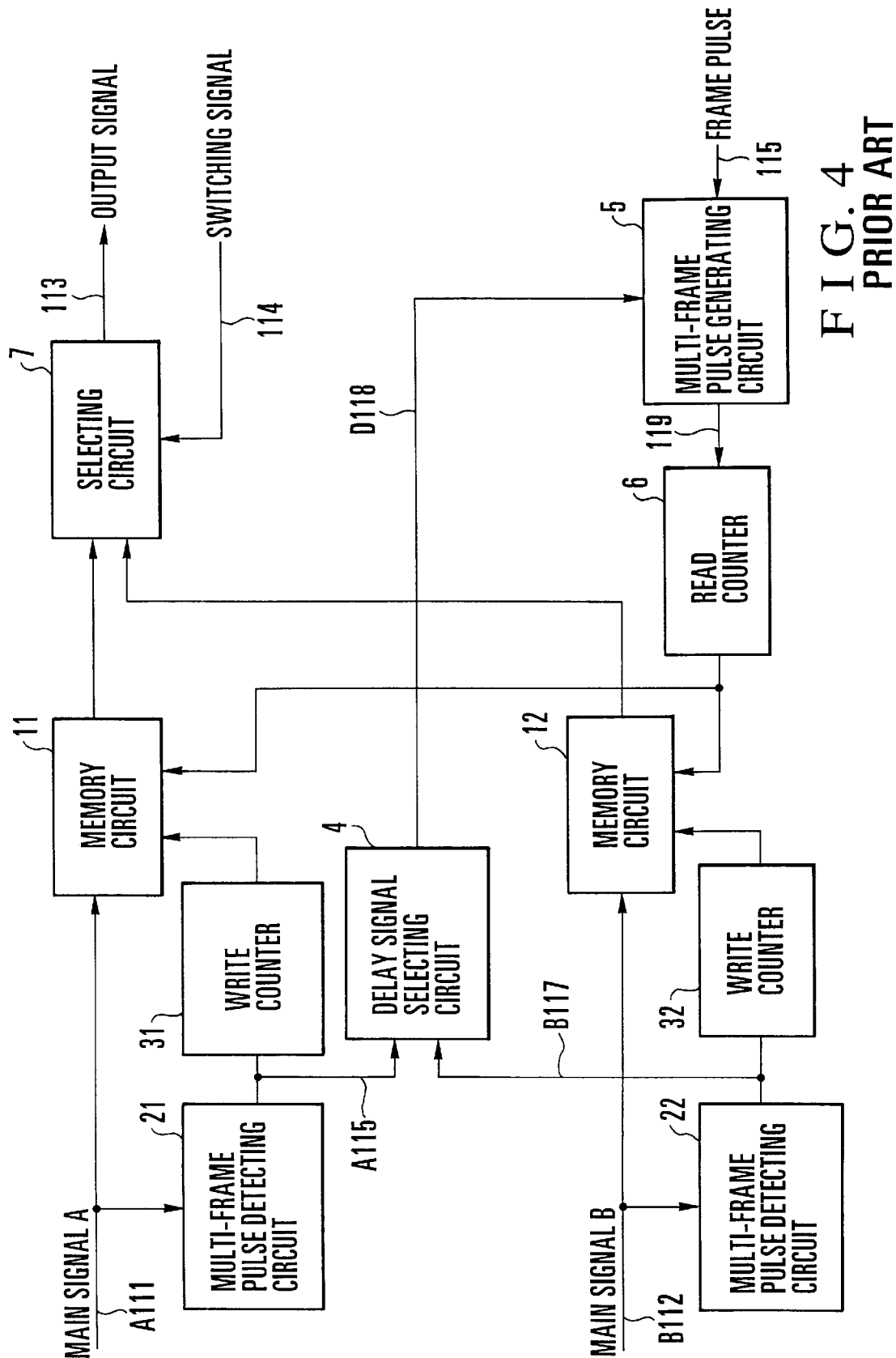
FIG. 4 is a block diagram of a conventional no-hit switching device.

Using the multi-frame pulse C117 (FIG. 3A) as a trigger, the write address counter 103 generates the write address 122 (FIG. 3E) for writing data in the memory circuit 101. In FIGS. 3C and 3D, the numbers on the frames of the selected signals A120 and B121 indicate the locations of data in the multi-frames. Using the multi-frame pulse C117 as a trigger, the write address 122 is generated, as shown in FIG. 3E. The generated write address 122 has the same value as the location of the selected signal A120 (FIG. 3C) in the multi-frame.

Using the multi-frame pulse D118 as a trigger, the read address counter 106 generates the read address 123 for reading out data from the memory circuit 101, as shown in FIG. 3G. FIG. 3G shows the generation of the read address 123 using the multi-frame pulse D118 (FIG. 3B) as a trigger. The generated read address 123 has the same value as the location of the selected signal B121 (FIG. 3D) in the multi-frame.

As shown in FIG. 3F, data of the selected signal A120 (FIG. 3C) is stored in a location of the memory circuit 101 having an address indicated by the write address 122 (FIG. 3E). Data is read out from a location of the memory circuit 101 having an address indicated by the read address 123 (FIG. 3G), and output as the output signal 124, as shown in FIG. 3H.

That is, the read address counter 106 receives the multi-frame pulse D118 with a larger phase delay, and in addition starts reading out data from the memory 101. More specifically, upon reception of the multi-frame pulse D118, the read address counter 106 reads out data at address 0 from the memory 101, and sequentially reads out data at addresses 1, 2, . . . , f, . . .

Since the multi-frame pulse D118 has the phase of the signal with a larger phase delay, the phase of data read out from the memory 101 matches that of the signal with a larger phase delay. Therefore, the phase of the data (signal with a smaller phase delay upon input) 124 read out from the memory 101 matches that of the data (signal with a larger phase delay upon input) B121 output from the main signal selecting circuit 182. Accordingly, even if the main signals A and B are switched by the selecting circuit 107, the output signal 113 free from any error can be obtained.

In this embodiment, a phase shift between the main signals A and B is absorbed by one memory circuit 101. No phase delay larger than the phase delay of the main signal A is generated.

According to the present invention, a no-hit switching apparatus for switching between two received signals without any hit comprises a phase comparing means for comparing the phases of the two signals, a first selecting means for selecting a signal with a smaller phase delay on the basis of the comparison results in the phase comparing means, a second selecting means for selecting a signal with a larger phase delay on the basis of the comparison in the phase comparing means, a memory means for storing the signal selected by the first selecting means, a read means for reading out the signal stored in the memory means with the phase of the signal with a larger phase delay, and a switching means for switching between the signal selected by the second selecting means and the signal read out by the read means. With this arrangement, the number of memory means can be decreased to one. Therefore, the number of components can be decreased to reduce the cost of the no-hit switching apparatus.

What is claimed is:

1. A no-hit switching apparatus comprising:

phase comparing means for comparing phases of two received signals;

first selecting means for selecting a signal with a smaller phase delay from the two received signals on the basis of a comparison result in said phase comparing means;

second selecting means for selecting a signal with a larger phase delay from the two received signals on the basis of comparison in said phase comparing means;

memory means for storing the signal selected by said first selecting means;

read means for reading out the signal stored in said memory means with a phase of the signal with the larger phase delay; and switching means for switching between the signal read out by said read means and the signal selected by said second selecting means.

2. An apparatus according to claim 1, further comprising:

phase signal selecting means for selecting a phase signal with a larger phase delay on the basis of the comparison result in said phase comparing means, and wherein said read means reads out the signal stored in said memory means in accordance with the phase signal with the larger phase delay selected by said phase signal selecting means.

3. An apparatus according to claim 2, further comprising:

read address output means for outputting a read address to said memory means using the phase signal with the larger phase delay selected by said phase signal selecting means as a trigger.

4. An apparatus according to claim 1, further comprising:

phase signal selecting means for selecting a phase signal with a smaller phase delay on the basis of the comparison result in said phase comparing means, and wherein said memory means performs a storage operation of the signal selected by said first selecting means in accordance with the phase signal with the smaller phase delay selected by said phase signal comparing means.

5. An apparatus according to claim 4, further comprising:

write address output means for outputting a write address of the signal selected by said first selecting means to said memory means using the phase signal with the smaller phase delay selected by said phase signal selecting means as a trigger.

6. An apparatus according to claim 1, further comprising:

first detecting means for detecting one phase signal of the received signals; and second detecting means for detecting the other phase signal of the received signals, and wherein said phase comparing means compares phases of the phase signals detected by said first and second detecting means.

7. A no-hit switching circuit comprising:

a first detecting circuit for detecting a multi-frame pulse of a first received signal;

a second detecting circuit for detecting a multi-frame pulse of a second received signal;

a phase comparing circuit for comparing phases of the multi-frame pulses detected by said first and second detecting circuits;

a multi-frame pulse output circuit for outputting a multi-frame pulse with a smaller phase delay and a multi-frame pulse with a larger phase delay on the basis of a comparison result of said phase comparing circuit;

a first selecting circuit for selecting a signal with a smaller phase delay from the first and second signals on the basis of the comparison result of said phase comparing circuit;

a second selecting circuit for selecting a signal with a larger phase delay from the first and second signals on the basis of comparison in said phase comparing circuit;

a memory circuit for storing the signal selected by said first selecting circuit;

a write address counter for generating a write address for said memory circuit using the multi-frame pulse with the smaller phase delay selected by said multi-frame pulse selecting circuit as a trigger;

a read address counter for generating a read address for said memory circuit using the multi-frame pulse with the larger phase delay selected by said multi-frame pulse selecting circuit as a trigger; and a switching circuit for switching between the signal read out from said memory circuit and the signal selected by said second selecting circuit in accordance with a switching signal.

* * * * *